United States Patent
Rai et al.

(10) Patent No.: US 7,068,993 B2
(45) Date of Patent: Jun. 27, 2006

(54) METHOD AND APPARATUS FOR PACKETIZED SUPPLEMENTAL WIRELESS DISTRESS SIGNALING

(75) Inventors: Vikram Rai, Randolph, NJ (US); Rui Adelino Silva, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 271 days.

(21) Appl. No.: 10/671,235

(22) Filed: Sep. 25, 2003

(65) Prior Publication Data

US 2005/0070315 A1   Mar. 31, 2005

(51) Int. Cl.
*H04M 11/04* (2006.01)
*H04M 3/42* (2006.01)
*H04M 1/00* (2006.01)
*H04Q 7/20* (2006.01)
*H04B 1/38* (2006.01)

(52) U.S. Cl. .................. 455/404.1; 455/466; 455/417; 455/550.1; 455/560

(58) Field of Classification Search ............. 455/404.1, 455/404.2, 412.1, 412.2, 414.1, 414.2, 414.3, 455/414.4, 415, 417, 418, 422.1, 445, 456.1, 455/456.2, 456.3, 456.5, 456.6, 457–462, 455/466, 560, 511–512, 514, 90.1, 550.1, 455/553.1, 556.2, 567, 432.3, 433; 379/37–51, 379/201.02, 201.03, 216.01, 308; 340/539.1, 340/539.12, 539.13
See application file for complete search history.

(56) References Cited

U.S. PATENT DOCUMENTS

| | | | | |
|---|---|---|---|---|
| 5,563,931 A | * | 10/1996 | Bishop et al. ........... | 455/404.1 |
| 6,233,445 B1 | * | 5/2001 | Boltz et al. .............. | 455/404.2 |
| 6,580,784 B1 | * | 6/2003 | Rodriguez et al. ....... | 379/88.12 |
| 6,678,357 B1 | * | 1/2004 | Stumer et al. ................ | 379/45 |
| 6,748,052 B1 | * | 6/2004 | Zellner et al. ................ | 379/45 |
| 6,868,074 B1 | * | 3/2005 | Hanson ..................... | 370/328 |
| 2002/0086659 A1 | * | 7/2002 | Lauper ........................ | 455/404 |
| 2003/0018724 A1 | * | 1/2003 | Mathewson et al. ........ | 709/206 |
| 2004/0185823 A1 | * | 9/2004 | Chin et al. ............... | 455/404.1 |
| 2004/0203622 A1 | * | 10/2004 | Esque et al. ............. | 455/412.1 |

FOREIGN PATENT DOCUMENTS

| WO | WO 97/21314 | * | 6/1997 |
|---|---|---|---|
| WO | WO 99/21380 | * | 4/1999 |

OTHER PUBLICATIONS

"OnStar Users Can Register Medical Info", www.ican.com/news/fullpage.cfm/articleid/419E6364-713A-4673-88CF8190EEE4F546/cx/auto.gm_services/article.cfm, Dec. 18, 2000, 2 pages.

* cited by examiner

*Primary Examiner*—Charles N. Appiah
*Assistant Examiner*—Meless Zewdu
(74) *Attorney, Agent, or Firm*—Stephen M. Gurey

(57) ABSTRACT

In response to the triggering of a user's mobile terminal, such as through pushing a dedicated button, by inputting a predetermined sequence of digits, through a menu selection, or automatically in response to an external input, a digital record containing user-specific information that is stored in the mobile terminal is packetized and transmitted over a signaling channel through the public wireless network, where the one or more packets are marked as being emergency 911 (E911) packets. From the header information in these packets, a Mobile Switching Center (MSC) in the wireless network, recognizes these E911 packets as being destined to that MSC's nearest Public Safety Answering Point (PSAP), and transmits the information contained in those packets to that PSAP.

24 Claims, 3 Drawing Sheets

METHOD AND APPARATUS FOR PACKETIZED SUPPLEMENTAL WIRELESS DISTRESS SIGNALING

TECHNICAL FIELD

This invention relates to wireless communications, and more particularly, to the use of wireless communications to assist in the provisioning of emergency services.

BACKGROUND OF THE INVENTION

Many hundreds of thousands of 911 calls are sent each day for varying types of medical and non-medical related emergencies. Of these many hundreds of thousands 911 calls, approximately 150,000 of these calls originate from mobile terminals. In view of the increasing numbers of 911 calls in general, and mobile-originated 911 calls specifically, the FCC has imposed E911 phase 1 and phase 2 requirements on local wireless carriers and Public Safety Answering Point (PSAP) providers to improve on the information which is transmitted over a 911 call to assist in providing a response that is accurately targeted at the whatever emergency is being reported and to the proper person or persons in need of the service. Thus, these FCC E911 requirements have imposed a requirement that PSAP providers add TTY capabilities to their call tracker stations. The E911 phase 2 requirements place geo-location requirements on calls originating from terminals to assist in locating the physical location from which a 911 call is originating from since a constant physical location cannot be associated with a wireless call from a known number as can a call from a landline telephone on the Public Switched Telephone Network (PSTN).

Once a call is made, getting as much pertinent information and as quickly as possible to the PSAP relating to the type and location of the emergency, and to the possible person who might need assistance is critical in determining how and when a response to the call should be made. Frequently, the person making the call is in such a distressed state that such critical information is misstated or is not given at all.

A prior art OnStar system offers its subscribers a MED-NET option in which its subscriber's medical information is provided to emergency response personnel upon a detected emergency. The OnStar system uses a proprietary satellite network to detect an emergency condition, and requires the user to subscribe to its service. With the MED-NET option, the OnStar advisor upon detecting a emergency in its subscriber's vehicle manually contacts emergency personnel and advises them of the availability of the medical information at a file at Global MED-NET, medical data storage and retrieval company. The emergency personnel then must separately contact that company to retrieve that information to assist in the care of the OnStar subscriber. Disadvantageously, only OnStar subscribers can avail themselves of this service. Further, the emergency personnel must affirmatively request the information from the MED-NET company.

SUMMARY OF THE INVENTION

In accordance with an embodiment of the present invention, in response to the triggering of a user's mobile terminal by an event, such as through pushing a dedicated button, by inputting a predetermined sequence of digits, through a menu selection, or automatically in response to an external input in response to an event external to the mobile terminal, a digital record containing user-specific information that is stored in the mobile terminal is packetized and transmitted over a signaling channel through the public wireless network without establishing an end-to-end connection. The one or more packets are marked in their headers as being emergency 911 (E911) packets. From the header information in these packets, a Mobile Switching Center (MSC) in the wireless network, recognizes these E911 packets as being destined to that MSC's nearest PSAP, and transmits the information contained in those packets to that PSAP using one of several possible transport mechanisms. A first transport mechanism is over a wireless signaling channel if the local PSAP has such wireless signaling capabilities. A second transport mechanism incorporates text-to-speech conversion of the data within contained within the packets, which converted audio signal is then sent via a standard 911 call to the nearest PSAP at a receiving number that is dedicated to receiving such calls. Another transport mechanism is via email. The packets are encapsulated in an email message and sent to an email address of the local PSAP that is known to the MSC. Even further, the information contained within the packets could be delivered by a direct hardwire data connection to a terminal at the PSAP, or could be sent via modem to a modem-equipped data terminal at the PSAP via a switched landline connection on the Public Switched Telephone Network (PSTN). Other transport mechanisms could also be used, and a combination of such mechanisms could also be used for purposes of redundancy.

In addition to the user-specific information that is stored in the mobile terminal, the information incorporated within the transmitted packets includes an identifier of the mobile terminal, and can further contain a plurality of other information including the geo-location information of the mobile terminal, the time and date, and a short digitized recorded voice signal of the user. Such other information is automatically added to the user-specific information when the mobile terminal is triggered to send such information. The user-specific information can include, for example, patient information, such as blood type, the user's name, address, and age, the user's known medical conditions, allergies, etc., an identification of the type of emergency, and other type of information that will assist emergency services in locating their target and potentially provide special care to patients with known medical problems.

An embodiment of the present invention could also be implemented in a system that automatically sends stored information when a user encounters non-911-type of situations. For example, the user's mobile terminal could be triggered to send a stored record of information over the public wireless network in response to an external event such as a road emergency. The wireless network could direct the packets containing vehicle information, location information, membership information, etc., to the user's roadside emergency provider, such as to a centralized AAA center, or to a nearest service station that belongs to the AAA network.

BRIEF DESCRIPTION OF THE DRAWINGS

The present invention will be better understood from reading the following description of non-limiting embodiments, with reference to the attached drawings, herein below.

DETAILED DESCRIPTION

Figure 1:
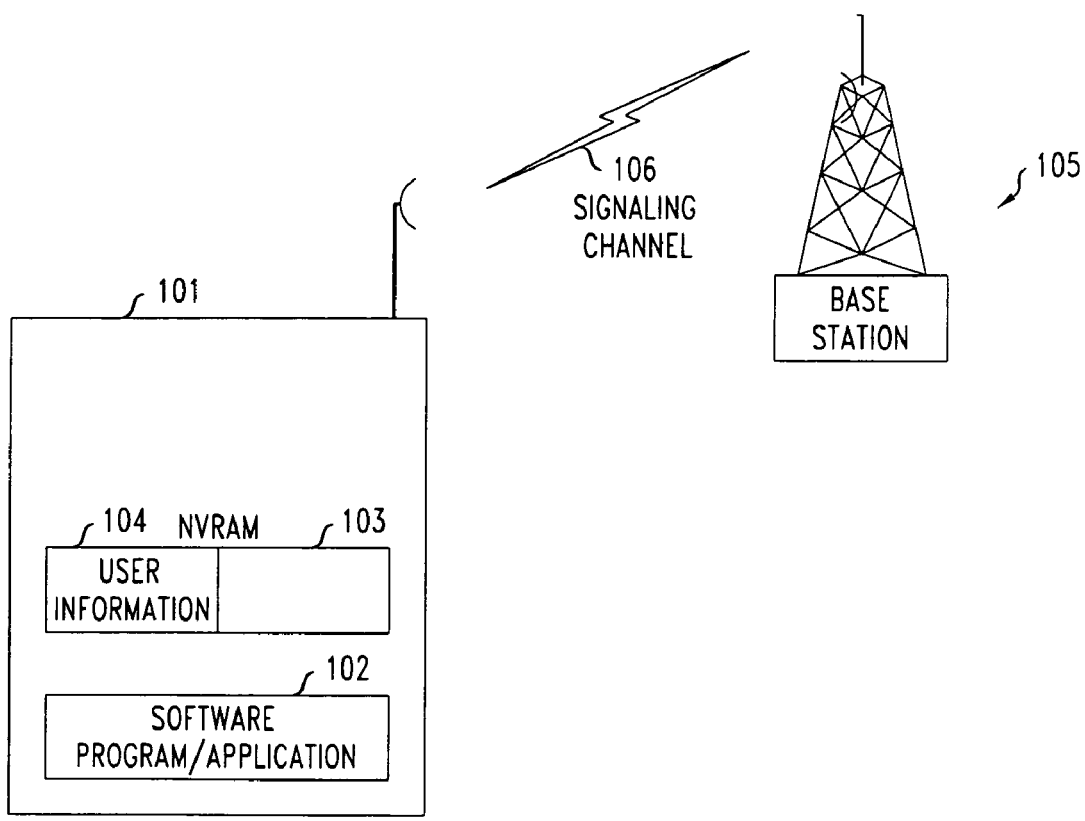
FIG. 1 shows a mobile terminal operating in accordance with an embodiment of the present invention.

An embodiment of the present invention is shown with reference to FIG. 1, in which a mobile terminal 101, in addition to its normal functionality, is shown running a software application or program 102 that enables the functionalities that will be described. Included within mobile terminal 101 is a non-volatile random access memory (NVRAM) 103. Stored in NVRAM 103 is a digital information record 104 into which is stored user-specific information that should a medical emergency occur, would be useful if made available to any medical team responding to such emergency through the PSAP. This information can include data such as the name, age and address of the user, the user's blood type, the user's doctor's name, address and telephone number, one or more persons to contact in case of an emergency, special medical conditions of the user, such as allergies, etc. of the user that could be critical in providing medical care to the user, insurance carrier information, and any other type of information relating to the user that would need to be divulged to the provider of medical services to the user in the event of an emergency. The user can input this information to NVRAM 103 by various methods such as through an adjunct alphanumeric terminal, directly through the input keys of the mobile terminal, through a data connection to the mobile terminal from a computer terminal into which such information has been inputted, or if the mobile terminal has Web capabilities, by downloading the information from a Web site at which the user has filled in a form. The information can be entered either in free form or it can be entered in template form in response to queries generated by the mobile terminal or external device through which the user is requested to input specific pieces of information.

Mobile terminal 101 can be any type of mobile terminal, such as a wireless telephone or a PDA, using any type of technology, such as CDMA, GSM, TDMA, UMTS, etc., that supports the transport of data messages via a signaling channel, such as SMS type of messaging on a CDMA system, or any other mechanism for transporting digital data on a signaling channel on the public wireless network that doesn't require establishing an end-to-end connection.

Upon being triggered, the stored information contained in record 104 is transmitted via the SMS-like signaling channel 106 to the base station 105 within which coverage area mobile terminal 101 is currently located. The user can initiate such triggering through, for example, inputting a sequence of one or more predetermined keypad digits, pushing a dedicated button, or selecting a choice through a menu available presented on the mobile terminal's alphanumeric or video screen. Also, mobile terminal 101, if integrated within a vehicle, for example, could be triggered in response to the occurrence of an event external to the terminal, such as the deployment of the airbags within the vehicle.

Figure 2:
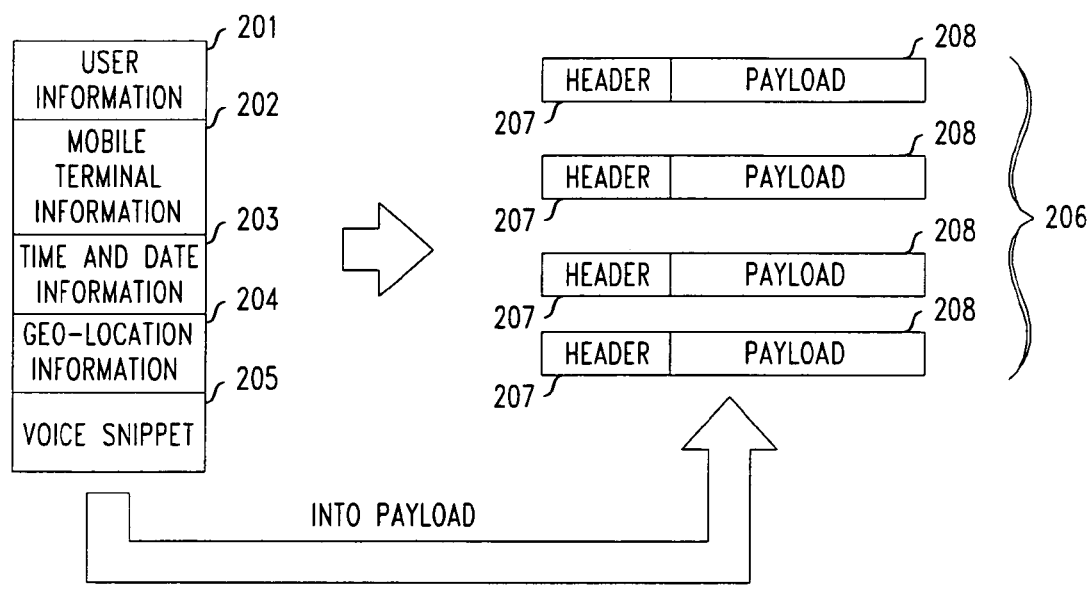
FIG. 2 shows the partitioning of the user information stored in the mobile terminal of FIG. 1 and additional information into packets for transmission.

Upon being triggered, the information stored in record 104 is packetized together with other additional information and transmitted, as noted above, on the signaling channel. FIG. 2 shows the partitioning of the user information and the additional information into packets for transmission. In addition to the user information 201 stored in record 104, terminal information 202, time and date information 203 and terminal geo-location information 204, if available, are combined for transmission to the PSAP. The terminal information 202 includes, for example, the mobile terminal's Electronic Serial Number (ESN) and the mobile terminal's phone number, which are automatically included within the payload information to be transmitted in the packets. Also, the current time and date information 203 could be automatically added as well as, if available, the geo-location information 204. This can be obtained from a GPS transceiver (not shown) associated with the mobile terminal as a separate unit or incorporated within the mobile terminal. Alternatively, the geo-location information can be determined using a known triangulation methodology. As noted above, the E911 phase 2 requirements place geo-location requirements on calls originating from mobile terminals. Thus, once such E911 phase 2 requirements have been implemented, such geo-location information will be available in all mobile terminals such as cellular phones.

If the mobile terminal has a digital voice recording capability, before triggering the transmission of the user data, the user could record a short voice snippet, which is digitized and appended as additional information 205 to be transmitted with the information 201, 202, 203 and 204.

In combination, the user information 201 that was inputted by the user into record 104, the terminal information 202, the time and date information 203, geo-location information 204, and the voice snippet 205 are useful to the receiving PSAP to determine the immediate location of the person who is calling regarding an emergency, and specialized user-specific medical and other information that will assist in providing care to that user as quickly and as efficiently as possible. The terminal information 202 is also useful to the PSAP for identifying individuals who abuse the E911 system by repeatedly sending such messages to the PSAP. Further, if the an external event has triggered the sending of the information to the PSAP, such as the deployment of a vehicle's airbags as noted above, information regarding that triggering event could also be automatically appended by mobile terminal to the other information being transmitted.

As noted in FIG. 2, the combined information 201, 202, 203, 204 and 205 is re-partitioned into one or more packets 206, each including a header 207 and a payload 209, the combined information being divided amongst the payloads of each such packet. The header of each packet contains information necessary for re-assembling the payloads of the multiple packets, as well as origination and destination information of the packets. Thus, the header may contain the ESN of the mobile terminal if it is a cellular phone or some other identification. With respect to the destination of the packet, each such packet will include a special identifier that marks that packet as being destined to a PSAP, which will be used by the MSC for routing of these packets. In order to avoid congestion on the signaling network, a maximum limit can be imposed on the number of packets that can be transmitted. Thus, software module 102 can limit the number of bytes of information 201 that can be entered into record 104 to a predetermined maximum so as to restrict the number of packets that are needed to contain that information as well as the automatically added information 202 and 203, and possibly 204 and 205 that in total forms the total payload to be transmitted.

The mobile terminal 101 can be responsive to different levels or types of emergencies, which would be individually triggered, for example, by the user pushing a particular button that is associated with that level or type, keying of an sequence of digits associated with that level or type, or making a menu selection associated with that level or type. Each level or type of emergency could have a separate associated record 104 containing user information that the user would want provided in the event of a specific level or type of emergency, together with the indication of the level or type of emergency. Alternatively, before being packetized with the device information and the geo-location information, the information in a common record 104 could be appended or pre-pended with the level or type of emergency as determined by the user's input selection. Further, if packet priorities are supported on the transport network, packet priorities can be assigned allowing the packets associated with a severe emergency to be sent with the highest priority. Further, if an external event triggers the mobile terminal, a priority appropriately commensurate with that event could be assigned.

Figure 3:
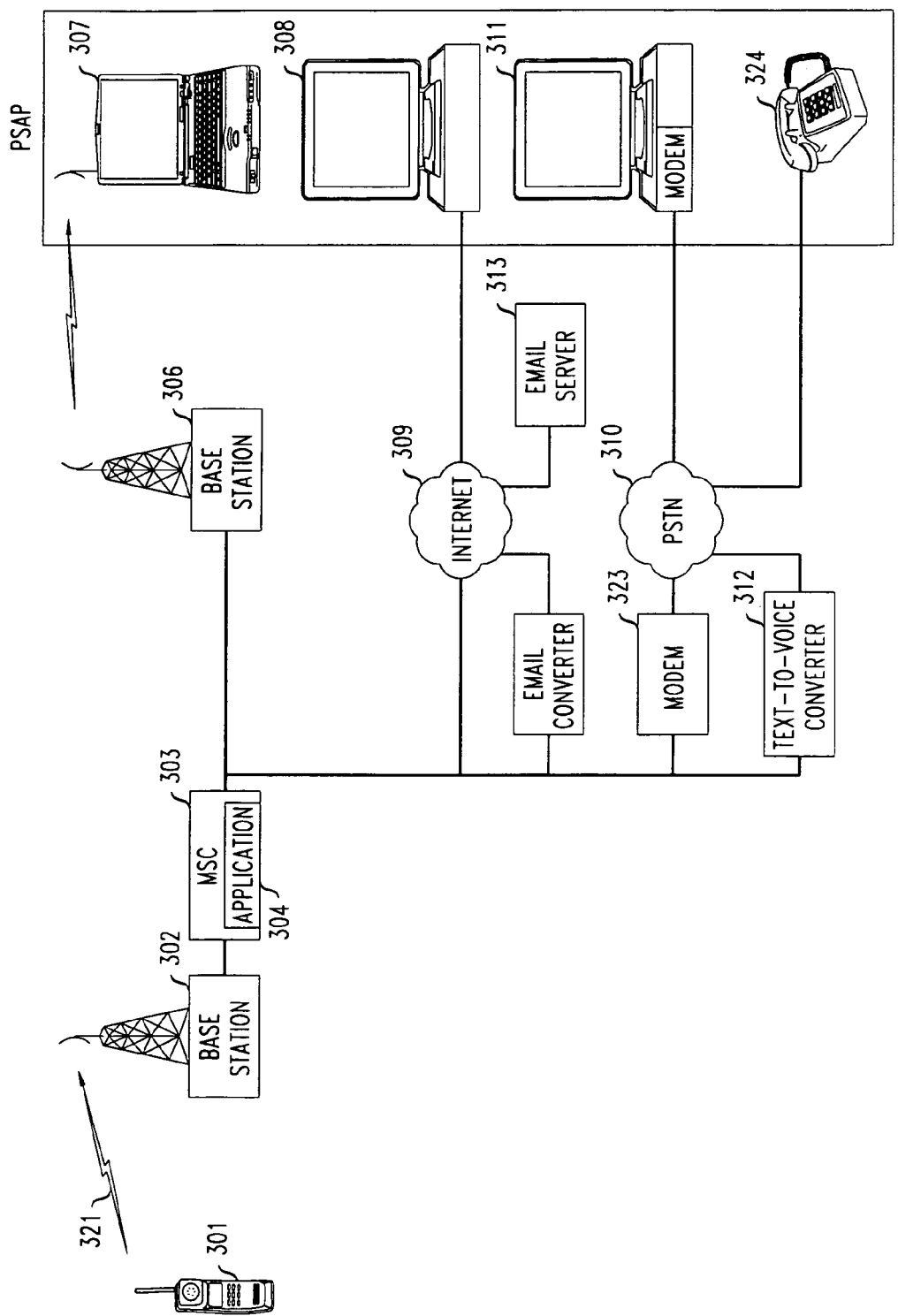
FIG. 3 is a block diagram of a system incorporating an embodiment of the present invention.

With reference to FIG. 3, mobile terminal 301 is either triggered by the user or is triggered automatically by an external event, packets are formed containing the stored user information, the device information, the time and date, the geo-location information, if available, possibly the type and level of the emergency, and possible a digitized voice snippet. These packets are then transmitted by mobile terminal 301 on the public wireless network via the signaling channel 321 to base station 302 and forwarded to the Mobile Switching Center (MSC) 303 associated with that base station 302 without establishing an end-to-end connection. MSC 303 runs a software program or application 304 that examines the packets received on the signaling channel. MSC 303 routes each packet that contains in its header a destination code that indicates that it is an E911 packet to the nearest local PSAP 305 in the same manner as it would route a 911 voice call from a mobile subscriber to that nearest local PSAP. If priorities are being utilized, MSC 303 will queue up the lower priority packets and give preference to transmitting higher priority packets.

MSC 303 can transmit the E911 packets to its nearest PSAP 305 using various methodologies of transport. For example, if PSAP 305 has the capability to receive SMS-type of messages over wireless signaling channels, then these packets could be transmitted by MSC 303 to the base station 306 within which coverage area PSAP 305 is located, where the packets are transmitted within an SMS-type of message to a wireless terminal 307 at PSAP 305.

An alternative would be to send the packets to PSAP 305 directly to a data terminal 308 at PSAP 305 via a packet data network, such as the Internet 309.

Another alterative would be to send the packets through a modem 323 over the PSTN 310 to a modem-equipped terminal 311 at PSAP 305, where a 911 operator at PSAP 305 would read the information.

Another alternative would be to concatenate the payload information in the multiple packets and use a text-to-speech converter 312 to convert resultant information to a voice signal, and to then send that voice signal over PSTN 310 to a 911 operator at PSAP 305 at a voice terminal 324 at a special number to which such calls would be directed.

Another alternative would be to use an email converter 325 that concatenates the payload information in the multiple packets and encapsulates the combined information within an email message that is then sent over the Internet 309 to the PSAP's email server 313 for notification to the 911 operator at terminal 308 at PSAP 305. Each MSC would store the email address of its respective closest PSAP. Such an option could be used for low-priority emergencies and could be used in combination with another delivery method for redundancy.

Advantageously, most of these described methods for delivering the information to the PSAP enable the information to be digitally stored, allowing for the retrieval of this information, which is also time stamped. This is analogous to the 911 audio tapes, which are extensively used for various purposes.

Upon an event that causes triggering of forwarding of the information either via the user's action or automatically, the same or different stored information could be sent, as will be described below, to both the PSAP and a different specified destination. Advantageously, and unlike the prior art commercially available OnStar MED-NET service, this information is stored on the user's mobile terminal, and is automatically and immediately sent over a public wireless network for direct transmission to the PSAP in the same manner as one would place a 911 emergency voice call. Thus, the user need not subscribe to an expensive service in order to avail himself of the advantage of being able to automatically transmit what might be critical medical-related information to emergency response personnel in a timely manner.

In the embodiment described above, the triggering of a user's mobile terminal either automatically or through a user's action causes the transmission of user information previously entered, terminal information, time and date information, geo-location information, and possibly a recorded voice snippet over an SMS-like signaling channel to an MSC, which routes that information to its associated and nearest PSAP without establishing an end-to-end connection between the mobile terminal and the PSAP. Upon triggering, stored information other than a user's medical information can also be automatically transmitted to a specified destination. For example, the user could store in a separate record in the NVRAM of his mobile terminal automobile information, such a make, model, color, license plate number, the road assistance company to which he subscribes, such as AAA, his road assistance subscriber identification, etc. Upon a road emergency, such as a flat tire, the user, by selecting a special button through a sequence of key inputs or through a menu, could trigger the mobile terminal to combine that information, the mobile terminal information, time and date, and the geo-location information of the terminal, packetize that information, and transmit that information on the SMS-like signaling channel to the base station for forwarding to the MSC without establishing any end-to-end connection. Appended to each such packet would be a header that includes in its destination field a special phone number, an email address, or an Internet address used by the user's road assistance company to receive such information. The MSC, by examining the destination field in the header, then routes those packets to the road assistance company in a manner appropriate to the type of address that is provided in the destination field. As in the embodiment described above, detecting the occurrence of an external event, such as a flat tire, could automatically trigger the sending of such information. Also, those roadside emergencies of a more serious nature, such as an accident, could be sent with a higher priority than other less serious occurrences if priorities are supported.

By adding additional intelligence at the MSC, the information contained in the packets received at the MSC could be directly routed to a destination that could respond to the user. For example, by invading the content of the information received from the mobile terminal to determine the nature of the event that has triggered the sending of the user information, the time and date of the occurrence, the mobile terminal information, the destination field, and the geo-location of the mobile terminal, the MSC could determine the service station that is a member of the user's identified roadside assistance company and is closest to the current location of the mobile terminal, and then directly forward that information to that service station.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method in a public wireless communications system comprising:
    at a mobile terminal:
    in response to a triggering event initiated by an occurrence of a certain type of situation, transmitting a message on a signaling channel that comprises previously stored user-specific information that is associated with the type of situation that has occurred, information that identifies the mobile terminal, and information that identifies a type of destination to which the message is directed and which is also associated with the type of situation that has occurred, wherein when a mobile switching center in the public wireless communications system receives the message, it determines an actual destination endpoint to which the message should be routed from the type of destination information in the message and routes the message to the actual destination endpoint, the message being routed to the actual destination endpoint without establishing an end-to-end connection between the mobile terminal and the actual destination endpoint.

2. The method of claim 1 wherein the message further comprises a geo-location of the mobile terminal.

3. The method of claim 1 wherein the message further comprises a time and date associated with the triggering event.

4. The method of claim 1 wherein the message further comprises a digitized voice snippet of a user.

5. The method of claim 1 wherein the triggering event is an input entered by a user at the mobile terminal.

6. The method of claim 1 wherein the triggering event is detecting an occurrence of a predetermined event external to the mobile terminal.

7. The method of claim 1 wherein the type of destination is a Public Safety Answering Point (PSAP) and the stored user specific information comprises user medical information.

8. The method of claim 1 wherein the message further comprises a priority, the information being transmitted on the wireless communications system in accordance with the priority.

9. The method of claim 1 wherein the message is transmitted within at least one packet, the at least one packet having a header that indicates the type of destination for the information.

10. The method of claim 1 wherein the signaling channel is an SMS signaling channel.

11. A method in a public wireless communications system comprising:
    at a mobile switching center:
    receiving on a signaling channel a message that was sent by a mobile terminal in response a triggering event that was initiated in response to an occurrence of a certain type of situation, the message comprising user-specific information that was previously stored at the mobile terminal and is associated with the type of situation that has occurred, information that identifies the mobile terminal, and information that identifies a type of destination to which the message is directed and which is also associated with the type of situation that has occurred,
    determining an actual destination endpoint from the type of destination information in the message; and
    routing the message to the actual destination endpoint, the message being routed to the actual destination endpoint without establishing an end-to-end connection between the mobile terminal and the actual destination endpoint.

12. The method of claim 11 wherein the actual destination endpoint is a mobile terminal and the received message is forwarded to the mobile terminal at the actual destination endpoint on a signaling channel.

13. The method of claim 11 wherein the actual destination endpoint has an associated email address and the received message is forwarded in an email message sent to the email address.

14. The method of claim 11 wherein the actual destination endpoint is a voice terminal and the user-specific information in the received message is converted to a voice signal and is forwarded to the voice terminal.

15. The method of claim 11 wherein the actual destination endpoint is a data terminal and the received message is forwarded on a data network to the data terminal.

16. The method of claim 11 wherein the received message further comprises a geo-location of the mobile terminal.

17. The method of claim 11 wherein the received message further comprises a time and date associated with the triggering event.

18. The method of claim 11 wherein the received message further comprises a digitized voice snippet of a user.

19. The method of claim 11 wherein the user specific information in the received message comprises user medical information, the actual destination endpoint is a Public Safety Answering Point (PSAP), and the received message is forwarded to the PSAP that is nearest to the mobile switching center.

20. The method of claim 11 wherein the received message is within at least one packet, the packet having a header that indicates a the type of destination for the message.

21. The method of claim 11 wherein the signaling channel is an SMS signaling channel.

22. The method of claim 11 wherein the received message further comprises a priority and the message is routed to the actual destination endpoint in accordance with the priority.

23. A computer readable media tangibly embodying a program of instructions executable by a computer to perform a method at a mobile terminal operating on a public wireless communications system, the method comprising:

in response to a triggering event initiated by an occurrence of a certain type of situation, transmitting a message on a signaling channel that comprises previously stored user-specific information that is associated with the type of situation that has occurred, information that identifies the mobile terminal, and information that identifies a type of destination to which the message is directed and which is also associated with the type of situation that has occurred, wherein when a mobile switching center in the public wireless communications system receives the message, it determines an actual destination endpoint to which the message should be routed from the type of destination information in the message and routes the message to the actual destination endpoint, the message being routed to the actual destination endpoint without establishing an end-to-end connection between the mobile terminal and the actual destination endpoint.

24. A computer readable media tangibly embodying a program of instructions executable by a computer to perform a method at a mobile switching center in a public wireless communications system, the method comprising:

receiving on a signaling channel a message that was sent by a mobile terminal in response to a triggering event that was initiated in response to an occurrence of a certain type of situation, the message comprising user-specific information that was previously stored at the mobile terminal and is associated with the type of situation that has occurred, information that identifies the mobile terminal, and information that identifies a type of destination to which the message is directed and which is also associated with the type of situation that has occurred, determining an actual destination endpoint from the type of destination information in the message; and routing the message to the actual destination endpoint, the message being routed to the actual destination endpoint without establishing an end-to-end connection between the mobile terminal and the destination endpoint.

* * * * *